United States Patent Office 3,479,413
Patented Nov. 18, 1969

3,479,413
1-HALO-1-NITRO-ALKYLSULFENYL HALIDES AND THEIR 1-NITRO-ALKYLDISULFIDE PRECURSORS
Gustave K. Kohn, Berkeley, and Joseph G. E. Fenyes, Oakland, Calif., assignors to Chevron Research Company, San Francisco, Calif., a corporation of Delaware
No Drawing. Continuation-in-part of application Ser. No. 442,812, Mar. 25, 1965. This application Mar. 8, 1968, Ser. No. 711,510
Int. Cl. C07c *149/14, 149/12, 145/00*
U.S. Cl. 260—543                                6 Claims

ABSTRACT OF THE DISCLOSURE

Compounds of the formula $$R-\underset{\underset{H}{|}}{\overset{\overset{NO_2}{|}}{C}}-S-S-\underset{\underset{H}{|}}{\overset{\overset{NO_2}{|}}{C}}-R \quad \text{and} \quad R-\underset{\underset{X}{|}}{\overset{\overset{NO_2}{|}}{C}}-S-X'$$

wherein X and X′ are chlorine or bromine and R is a hydrocarbon radical of 1 to about 15 carbon atoms which is free of aliphatic unsaturation and is bonded to the carbon atom bonded to the sulfur by an aliphatic carbon atom. These compounds are useful as intermediates for preparing fungicidal compounds.

CROSS REFERENCE TO RELATED APPLICATIONS

This application is a continuation-in-part of copending application Ser. No. 442,812, filed Mar. 25, 1965, and now abandoned.

FIELD OF INVENTION

This invention relates to novel nitro-substituted organic sulfur compounds and their preparation. More particularly it relates to bis(1-nitrohydrocarbyl) disulfides and 1-nitrohydrocarbylsulfenyl halides.

DESCRIPTION OF INVENTION

The novel compounds of this invention may be represented by the formulas:

$$R-\underset{\underset{H}{|}}{\overset{\overset{NO_2}{|}}{C}}-S-S-\underset{\underset{H}{|}}{\overset{\overset{NO_2}{|}}{C}}-R \quad \text{and} \quad R-\underset{\underset{X}{|}}{\overset{\overset{NO_2}{|}}{C}}-S-X'$$

wherein X and X′ are halogen of atomic number 17 to 35 i.e., chlorine and bromine, and R is a hydrocarbon radical of 1 to about 15 carbon atoms which is free of aliphatic unsaturation and is bonded to the carbon atom bonded to the sulfur by an aliphatic carbon atom. Preferably R is alkyl or aralkyl. The aryl group in the aralkyl radical will usually be monocyclic of 6 to 10 carbon atoms. X and X′ may be the same or different. Particularly preferred compounds are those wherein X and X′ are chlorine and R is alkyl of 1 to about 6 carbon atoms.

Representative examples of the novel disulfides of this invention are: bis(1-nitroethyl) disulfide, bis(1-nitrobutyl) disulfide, bis(1-nitro-2-phenylethyl) disulfide, bis(1-nitrodecyl) disulfide, bis(1-nitrododecyl) disulfide, bis(1-nitro-2-phenyldecyl) disulfide, bis(1-nitro-2-cyclohexylethyl) disulfide, bis(1-nitropentadecyl) disulfide, bis(1-nitro-3-cyclobutylpropyl) disulfide, bis(1-nitro-2-naphthylethyl) disulfide, bis(1-nitro-3-p-tolylpropyl) disulfide, bis(1-nitro-2-cyclooctylethyl) disulfide, and the like.

Representative examples of the novel sulfenyl halides of this invention are: 1-chloro-1-nitroethylsulfenyl chloride, 1-bromo-1-nitroethylsulfenyl chloride, 1-chloro-1-nitropropylsulfenyl chloride, 1-bromo-1-nitropropyl-sulfenyl bromide, 1-chloro-1-nitrobutylsulfenyl chloride, 1-chloro-1-nitro-4-methylhexylsulfenyl chloride, 1-chloro-1-nitro-2-phenylethylsulfenyl halide, 1-chloro-1-nitrodecylsulfenyl chloride, 1-chloro-1-nitro-10-phenyldecyl-sulfenyl halide, 1-chloro-1-nitro-3-cyclohexylpropylsulfenyl chloride, 1-bromo-1-nitro-3-naphthylpropyl-sulfenyl bromide, 1-chloro-1-nitro-2-cyclopropylethylsulfenyl chloride, 1-chloro-1-nitro-pentadecylsulfenyl chloride, 1-chloro-1-nitro-4-cumylbutylsulfenyl chloride and the like.

The disulfides of this invention are prepared by (1) reacting a primary nitro hydrocarbon with an alkali metal or alkaline earth metal alkoxide to form the salt of the nitro hydrocarbon and (2) reacting the salt with sulfur monochloride in an inert, anhydrous nonhydroxylic medium to form a bis(1-nitrohydrocarbyl) disulfide. Halogenation of the bis(1-nitrohydrocarbyl) disulfide produces the unique 1-nitrohydrocarbyl sulfenyl halides of the invention.

This total synthesis may be represented by the following reaction scheme:

$$RCH_2NO_2 + M \rightarrow RC^{\ominus}HNO_2M^{\oplus}$$

$$RC^{\ominus}HNO_2M^{\oplus} + S_2Cl_2 \rightarrow RCH(NO_2)-S-S-(NO_2)HCR$$

$$RCH(NO_2)-S-S-(NO_2)HCR + X_2 \rightarrow 2RCX(NO_2)-SX$$

The resulting sulfenyl halide may be further treated to obtain variance in the halogens within the compound. For instance, the compound RCX(NO₂)—SX may be treated with HX′ to obtain $$RCX(NO_2)-SX'$$

R, X and X′ are as previously defined. M represents an alkali or alkaline earth metal, preferably sodium.

The starting primary nitro compounds used in carrying out this synthesis are well known. Illustrative compounds are nitroethane, 1-nitropropane, 1-nitrobutane, 1-nitro-4-methylhexane, (2-nitroethyl) benzene, etc.

The nature of the alkanol used in obtaining the alkali or alkaline earth metal salt of the starting primary nitro compound is not critical. It is only necessary that it be appropriate for reaction with the metal to form the alkoxide. Because they are easily obtainable and inexpensive, the lower alkanols (i.e., alkanols of 1 to 4 carbon atoms) such as methanol, ethanol and butanol will usually be employed in the synthesis.

The medium in which the salt is reacted with S₂Cl₂ must be inert to both the reactants. It is also essential that the medium be anhydrous and nonhydroxylic for the successful formation of the novel bis(1-nitrohydrocarbyl) disulfides. Examples of suitable media are ether, hexane, benzene, dioxane, higher alkyl ethers, etc.

Ordinarily, it is preferable to maintain a temperature of about 0–10° C. during the preparation of the metal salt. However, temperatures from about 0 to 25° C. may be used in this step of the process. In the preparation of the bis-disulfide temperatures in the range of −5 to +15° C. may be used. Preferably, temperatures between about 0 to 5° C. are used in this step of the process. The halogenation of the disulfide may be carried out at temperatures varying from about −25 to +15° C. Preferably, temperatures from 0 to 5° C. are used in the halogenation.

EXAMPLES

This invention is illustrated but not limited by the following examples. Unless otherwise indicated, percentages are by weight.

Example 1

In a flask, 15.8 gms. of sodium were dissolved in 500 ml. methanol. This mixture was cooled in an ice bath to 5 to 15° C. and 50.0 gms. of nitroethane were added dropwise from a funnel. 300 ml. of ether was added and the mixture was filtered and thoroughly washed with ether. The solids were suspended in 500 ml. of ether and transferred to a 1 liter round bottom flask and chilled to 0–5° C. To this suspension 49.5 gms. of sulfur monochloride were added dropwise over a ½-hour period. After continuous stirring for 3 hours, the mixture was filtered. The ether layer was washed with ice water and then dried with $MgSO_4$ and celite, filtered, redried with $CaCl_2$ and celite and refiltered. The ether was stripped off at ambient temperatures and 0.5 mm. Hg to yield 25 gms. of bis(1-nitroethyl) disulfide. Sp. gr. $1.3786^{26°}$, $n_D^{26°}$ 1.5553.

The bis(1-nitroethyl) disulfide was dissolved in 73 gms. $CCl_4$ and placed in a 100 ml. flask. One drop of sulfuric acid and 3 drops of tributyl phosphate were added. The flask was cooled to 0 to −5° C. At this temperature 50 gms. of $Cl_2$ were bubbled into the mixture over a one-hour period, with stirring at 0° C. for an additional hour. The $CCl_4$ was stripped off to 25° C. under vacuum and the resulting liquid was fractionally distilled. At 30.5° C. and 0.07–0.1 mm. Hg 14.5 gms. of 1-chloro-1-nitroethyl-sulfenyl chloride were recovered. Calculated values of percent Cl and percent S were 40.3 and 18.3, respectively; found were 39.8 and 18.8.

Example 2

In a flask 23.00 gms. of sodium were dissolved in 500 ml. methanol. This mixture was chilled in an ice bath and 89.10 gms. of 1-nitropropane were added dropwise from a dropping funnel. The mixture was filtered and the solids were thoroughly washed with ether. The solids were transferred to another vessel, suspended in ether and chilled to 0–5° C. To the suspension 67.5 g. of $S_2Cl_2$ were added dropwise over ¾ hour. This mixture was filtered and the ether layer was washed with ice water and dried over $MgSO_4$. The dried mixture was filtered; the solvent was stripped off under vacuum, and the stripped product was topped at 50° C., 0.1 mm. Hg to yield 111.0 g. bis(1-nitropropyl) disulfide. The percent N and S were calculated as 11.65% and 26.68%, respectively; found were 10.28% and 29.1%.

Into a flask were charged 103 gms. bis(1-nitropropyl) disulfide and 250 ml. $CCl_4$. The mixture was chilled in an ice bath and 4 drops of tributyl phosphate were added. The mixture was chlorinated by bubbling in 200 gms. $Cl_2$ gas. The $CCl_4$ was stripped off and the residue was fractionally distilled. A fraction weighing 78.7 gms. was recovered at 37–39° C. and 0.08–0.1 mm. Hg. This fraction was analyzed and found to be 1-chloro-1-nitropropylsulfenyl chloride. Calculated: Cl, 37.32%; N, 7.37%; S, 16.87%. Found: Cl, 36.00%; S, 17.05%. The compound is a viscous yellow liquid characterized by a strong smell of onion and garlic.

Example 3

In the manner described in Examples 1 and 2, bis(1-nitrobutyl) disulfide and 1-chloro-1-nitrobutylsulfenyl chloride were prepared. The sulfenyl chloride was found to boil at 30–49.5° C. and 0.02–0.05 mm. Hg and be a yellow foul-smelling liquid. Calculated: Cl, 34.70%; S, 15.7%. Found: Cl, 31.2%; S, 15.45%.

Example 4

To 20 gms. of 1-chloro-1-nitropropyl sulfenyl chloride in a flask were added dropwise 12 ml. of HBr. The mixture was maintained at ice bath temperature during the addition. Cold hexane was added and the mixture was washed in ice water twice and then dried over $MgSO_4$. The hexane was stripped off under pressure leaving 20.7 gms. of a reddish-colored liquid residue. This residue was determined to be 1-chloro-1-nitropropyl sulfenyl bromide. Calculated: Cl, 15.12%; Br, 34.07%; S, 13.67%. Found: Cl, 15.1%; Br, 33%; S, 14.15%.

Example 5

In a flask 2.5 gms. of sodium were dissolved in 50 ml. methyl alcohol and 16.2 gms. 2-nitroethylbenzene was added thereafter. A precipitate was formed and allowed to stand overnight. The precipitate was then filtered, thoroughly washed with ether and then suspended in 100 ml. dry ether. While stirring the suspension, 7.3 gms. of sulfur monochloride in 10 ml. of ether were slowly added. The reaction mixture was chilled in an ice water bath during the sulfur monochloride addition. The reaction product was filtered and the filtrate concentrated by evaporation under pressure leaving 9.7 gms. of a dark brown very viscous liquid residue. This residue was determined to be bis(1-nitro-2-phenylethyl) disulfide. Calculated: N, 7.68%; S, 17.5%. Found: N, 7.23%; S, 14.0%.

This residue was dissolved in 100 ml. $CCl_4$ containing 2 drops of tributyl phosphate and 2–3 drops $H_2SO_4$. An excess of chlorine gas was slowly introduced while the temperature was kept below 5° C. and the mixture was mechanically stirred. Stirring continued for 10 hours after the addition of the gas, after which the reaction mixture was filtered and the filtrate concentrated under reduced pressure. The resulting residue was analyzed spectroscopically and determined to contain 1-chloro-1-nitro-2-phenylethyl sulfenyl chloride.

The novel nitrosulfenyl halides of the invention may be used as intermediates in the preparation of a wide variety of biologically active derivatives. They react with imides, hydantoins, amides, phosphates, etc., through the sulfenyl halide functionality (S–X). The sulfenyl halides of this invention are particularly useful as intermediates for preparing fungicidally-active compounds. Many of them were reacted with dicarboximides and thiols to give compounds which effectively controlled such fungi as *Monilia fructicola, Alternaria solani, Fusarium solani,* Pythium, Rhizoctonia and Verticillium. For instance they were used to make the following fungicidal compounds: methyl-1-chloro - 1-nitroethyl disulfide, p-chlorophenyl-1-chloro-1-nitroethyl disulfide, acetyl-1-chloro-1-nitroethyl disulfide, 1 - chloro - 1-nitroethyldiethioacetic acid, 3-(1-chloro-1-nitropropyldithio) propionic acid, 1-chloro-1-nitropropyldithioacetic acid, N-(1-chloro-1-nitroethylthio) phthalimide, N-(1-chloro-1-nitropropylthio) phthalimide, N-(1-chloro-1-nitroethylthio)-cis-$\Delta^4$-tetrahydrophthalimide, N-(1 - chloro - 1-nitropropylthio)-cis-$\Delta^4$- tetrahydrophthalimide, 3-(1-chloro-1-nitropropylthio) hydantoin and N,N-di-(1-chloro-1-nitropropylthio)uracil.

As will be evident to those skilled in the art, various modifications on this process can be made or followed, in the light of the foregoing disclosure and discussion, without departing from the spirit or scope of the disclsure or from the scope of the following claims.

We claim:

1. Compound of the formula:

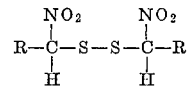

wherein R is alkyl of 1 to 6 carbon atoms.

2. The compound of claim 1 wherein R is methyl, ethyl or n-propyl.

3. Compound of the formula:

wherein X and X' are halogen of atomic number 17 to 35 and R is alkyl of 1 to 6 carbon atoms.

4. The compound of claim 3 wherein X and X' are chlorine.

5. The compound of claim 3 wherein X and X' are chlorine and R is methyl, ethyl or n-propyl.

6. Process for preparing disulfides of the formula:

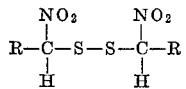

wherein R is alkyl of 1 to 6 carbon atoms which comprises reacting a compound of the formula

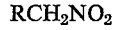

wherein R is as defined previously with an alkali or alkaline earth metal alkoxide to form a salt and reacting said salt with sulfur monochloride in an anhydrous, nonhydroxylic liquid medium.

No references cited.

LORRAINE A. WEINBERGER, Primary Examiner

HAROLD C. WEGNER, Assistant Examiner

U.S. Cl. X.R.

260—260, 309.5, 326, 502.6, 609, 999